United States Patent
Fuse et al.

(10) Patent No.: US 8,143,349 B2
(45) Date of Patent: *Mar. 27, 2012

(54) METHOD FOR PRODUCING OLEFINIC THERMOPLASTIC ELASTOMER

(75) Inventors: Kazuyoshi Fuse, Chiba (JP); Hironobu Shigematsu, Kobe (JP); Takeshi Tominaga, Chiba (JP)

(73) Assignee: Sumitomo Chemical Company, Limited, Tokyo (JP)

( * ) Notice: Subject to any disclaimer, the term of this patent is extended or adjusted under 35 U.S.C. 154(b) by 86 days.

This patent is subject to a terminal disclaimer.

(21) Appl. No.: 12/517,380

(22) PCT Filed: Dec. 19, 2007

(86) PCT No.: PCT/JP2007/075046
§ 371 (c)(1),
(2), (4) Date: Jul. 13, 2009

(87) PCT Pub. No.: WO2008/075785
PCT Pub. Date: Jun. 26, 2008

(65) Prior Publication Data
US 2010/0010155 A1    Jan. 14, 2010

(30) Foreign Application Priority Data
Dec. 21, 2006 (JP) ................................ 2006-344192
Dec. 21, 2006 (JP) ................................ 2006-344193

(51) Int. Cl.
*C08F 8/00* (2006.01)
*C08J 3/00* (2006.01)
*C08L 9/00* (2006.01)
*C08L 23/00* (2006.01)
*C08L 45/00* (2006.01)

(52) U.S. Cl. ........ 525/191; 525/192; 525/197; 525/211; 525/232; 525/240

(58) Field of Classification Search .................. 525/191, 525/192, 197, 211, 232, 240
See application file for complete search history.

(56) References Cited

U.S. PATENT DOCUMENTS
6,670,426 B2 * 12/2003 Kanae et al. ................ 525/329.5
2010/0004400 A1 * 1/2010 Fuse et al. ..................... 525/232

FOREIGN PATENT DOCUMENTS
| EP | 1 605 015 A1 | 12/2005 |
| GB | 2 424 224 A | 9/2006 |
| JP | 5-220825 A | 8/1993 |
| JP | 2006-37115 A | 2/2006 |
| WO | 2007/145705 A1 | 12/2007 |

* cited by examiner

*Primary Examiner* — Nathan M Nutter
(74) *Attorney, Agent, or Firm* — Sughrue Mion, PLLC (57) ABSTRACT

A method for producing an olefinic thermoplastic elastomer comprising the steps of kneading an olefin copolymer rubber (A) obtained by polymerizing ethylene, an α-olefin having 3 to 20 carbon atoms and a non-conjugated polyene, a volatile organic solvent (B) and, an olefin resin (C) in an extruder, removing the volatile organic solvent (B) while kneading, then adding a crosslinking agent (E) and further removing the volatile organic solvent (B) while kneading in the extruder to obtain the olefinic thermoplastic elastomer.

5 Claims, 2 Drawing Sheets

METHOD FOR PRODUCING OLEFINIC THERMOPLASTIC ELASTOMER

TECHNICAL FIELD

The present invention relates to a method for producing an olefinic thermoplastic elastomer.

BACKGROUND OF THE INVENTION

Thermoplastic elastomers do not require a vulcanization process and can be processed by a molding machine for processing an ordinary thermoplastic resin. These characteristics are being harnessed to use thermoplastic elastomers in a broad range of fields, including automobile parts, home electric appliances or other miscellaneous goods. Among thermoplastic elastomers, an olefinic thermoplastic elastomer obtained by kneading an olefin copolymer rubber obtained by polymerizing ethylene, an α-olefin having 3 to 20 carbon atoms and a non-conjugated polyene, with an olefin resin, is widely used as a material that is light weight, recyclable, chlorine-free and environmentally friendly.

Known production methods of olefinic thermoplastic elastomers include kneading an olefin copolymer rubber and an olefin resin in a closed mixer as exemplified by a Banbury mixer. However, because a batch kneader, such as a Banbury mixer, is used, this method suffers from the problems of having poor productivity and being inefficient.

A method known for resolving these problems is to knead the olefin copolymer rubber and olefin resin with a twin-screw extruder. For example, JP-A-5-220825 describes a method for producing an olefinic thermoplastic elastomer composition by directly supplying a mixture mainly composed of an olefin copolymer rubber and a polyolefin resin to a twin-screw extruder with a L/D of 20 or more, during a dynamic heat treatment in the presence of an organic peroxide having a temperature of 160° C. or more, which half-life is one minute; controlling the cylinder temperature at the raw material supply port side of the twin-screw extruder to between 130 to 155° C. over a length ten times that of the port diameter of the twin-screw extruder; and controlling the cylinder temperature at the die side, excluding the cylinder portion which is controlled at the temperature at between 180 to 280° C., over a length ten times that of the port diameter of the twin-screw extruder.

SUMMARY OF THE INVENTION

However, when only an olefin copolymer rubber, olefin resin and a crosslinking agent are simultaneously supplied to the extruder and then kneaded together, fisheyes form on the molded article molded using the obtained olefinic thermoplastic elastomer, and a molded article with a good appearance cannot be obtained.

An object of the present invention is to provide a method for efficiently producing an olefinic thermoplastic elastomer to serve as a material for producing a molded article having a good appearance.

Specifically, the present invention is a method for producing an olefinic thermoplastic elastomer comprising the steps of kneading an olefin copolymer rubber (A) obtained by polymerizing ethylene, an α-olefin having 3 to 20 carbon atoms and a non-conjugated polyene, a volatile organic solvent (B), an olefin resin (C) and, optionally, a mineral oil softener (D) in an extruder, removing the volatile organic solvent (B) while kneading, then adding a crosslinking agent (E), and further removing the volatile organic solvent (B) while kneading in the extruder to obtain the olefinic thermoplastic elastomer.

According to the production method of the present invention, an olefinic thermoplastic elastomer to serve as a material for producing a molded article having a good appearance can be efficiently produced.

DESCRIPTION OF SYMBOLS

1: First extruder
2: Second extruder
3: Supply port
4: Mixed solvent (B) supply pump
5: Mineral oil softener (D) supply pump
6: Supply port
7: Vent
8: Vent
9: Vent
10: Crosslinking agent (E) supply pump
11: Vent
12: Olefin copolymer rubber polymerization tank
13: Mineral oil softener (D) supply pump
14: Crosslinking agent (E) supply pump
15: Olefin resin (C) supply port
16: Vent
17: Vent
18: Vent
19: Extruder
20: Second extruder
21: Olefin copolymer rubber polymerization tank
22: Olefin resin (C) supply port
23: Vent
24: Vent
25: Vent
26: Mineral oil softener (D) supply pump
27: Crosslinking agent (E) supply pump
28: First extruder
29: Supply port

BEST MODE FOR CARRYING OUT THE INVENTION

In the present invention, an olefin copolymer rubber (A) is used, which is obtained by polymerizing ethylene, an α-olefin having 3 to 20 carbon atoms and a non-conjugated polyene. The "olefin copolymer rubber (A)" in the present invention is an ethylene/α-olefin/non-conjugated polyene copolymer rubber having an A hardness according to JIS K-6253 of 98 or less. In the following, the term "ethylene unit" refers to the monomer-derived constitutional units present in rubber obtained by polymerization or in a resin.

Examples of the α-olefin having 3 to 20 carbon atoms can include propylene, 1-butene, 2-methylpropylene, 1-pentene, 3-methyl-1-butene, 1-hexene, 4-methyl-1-heptene and 1-octene, as well as a combination of two or more thereof. Among these examples, propylene or 1-butene is preferred in view of availability, and propylene is more preferred.

Examples of the non-conjugated polyene can include a chain non-conjugated diene such as 1,4-hexadiene, 1,6-octadiene, 2-methyl-1,5-hexadiene, 6-methyl-1,5-heptadiene and 7-methyl-1,6-octadiene; a cyclic non-conjugated diene such as cyclohexadiene, dicyclopentadiene, methyltetrahydroindene, 5-vinylnorbornene, 5-ethylidene-2-norbornene, 5-methylene-2-norbornene, 5-isopropylidene-2-norbornene and 6-chloromethyl-5-isopropenyl-2-norbornene; and a triene such as 2,3-diisopropylidene-5-norbornene, 2-ethylidene-3-isopropylidene-5-norbornene, 2-propenyl-2,2-norbornadiene and 4-ethylidene-8-methyl-1,7-nanodiene. Among these examples, preferred is 5-ethylidene-2-norbornene or dicyclopentadiene.

If the total of the ethylene units, α-olefin units having 3 to 20 carbon atoms and non-conjugated polyene units contained in the olefin copolymer rubber (A) is 100% by weight, then the amount of ethylene units contained in the olefin copolymer rubber (A) is normally 30 to 90% by weight, and preferably 40 to 80% by weight; the amount of α-olefin units having 3 to 20 carbon atoms is normally 5 to 70% by weight, and preferably 15 to 60% by weight; and the amount of non-conjugated polyene units is normally 0.1 to 30% by weight, and preferably 0.1 to 20% by weight (the total of these three types of monomer units is 100% by weight). Specific examples of the olefin copolymer rubber (A) can include ethylene/propylene/5-ethylidene-2-norbornene copolymer, ethylene/propylene/dicyclopentadiene copolymer, ethylene/propylene/1,4-hexadiene copolymer and ethylene/propylene/5-vinyl-2-norbornene copolymer, as well as combinations of two or more thereof. Among these examples, preferred is an ethylene/propylene/5-ethylidene-2-norbornene copolymer having an ethylene unit content of 40 to 80% weight, a propylene unit content of 15 to 55% by weight and a 5-ethylidene-2-norbornene unit content of 2 to 10% by weight.

The olefin copolymer rubber (A) can be obtained by polymerizing by a known process. Examples of the polymerization method can include polymerizing in an inert solvent, such as hexane, heptane, toluene and xylene, using a polymerization catalyst such as a Ziegler-Natta catalyst or a metallocene catalyst.

The Mooney viscosity ($ML_{1+4}$ 100° C.) of the olefin copolymer rubber (A) is preferably 10 to 350, and more preferably 30 to 300. An olefinic thermoplastic elastomer obtained using an olefin copolymer rubber (A) having a Mooney viscosity within this range has excellent mechanical strength when molded and can provide a molded article having an extremely good appearance.

Specific examples of the volatile organic solvent (B) used in the present invention include aliphatic hydrocarbons, such as pentane, hexane, heptane, octane, decane, dodecane and kerosene, as well as halogen derivatives thereof; alicyclic hydrocarbons such as cyclohexane, methylcyclopentane and methylcyclohexane, as well as halogen derivatives thereof; and aromatic hydrocarbons such as benzene, toluene and xylene, as well as halogen derivatives thereof such as chlorobenzene. These organic solvents may be used alone or in combination. The volatile organic solvent (B) can be the solvent used for polymerizing the olefin copolymer rubber (A) by solution polymerization. From the standpoint of compatibility with the olefin copolymer rubber (A), the volatile organic solvent (B) can include the monomer used for polymerizing the olefin copolymer rubber W.

The olefin resin (C) in the present invention is a resin obtained by polymerization of ethylene and/or an α-olefin. Specific examples include ethylene resin containing 70% by weight or more of ethylene units and propylene resin containing 50% by weight or more of propylene units.

Examples of the propylene resin used for olefin resin (C) in the present invention include a propylene homopolymer containing 50 to 100% by weight, and preferably 80 to 100% by weight, of propylene units, and a random copolymer or block copolymer of propylene, ethylene and/or an α-olefin having 4 to 10 carbon atoms (for example, 1-butene, 1-hexene, 1-pentene, 1-octene and 4-methyl-1-pentene). Examples of such a copolymer can include ethylene/propylene copolymer, propylene/1-butene copolymer, propylene/1-hexene copolymer, propylene/1-octene copolymer, propylene/ethylene/1-butene copolymer and ethylene/propylene/1-hexene copolymer. As the olefin resin (C), a propylene homopolymer, ethylene/propylene copolymer or propylene/1-butene copolymer are preferably used.

The term "block copolymer" described above means, for the case of using propylene and ethylene, a polymer produced by a production method comprising the following steps.
(1) Producing polypropylene by homopolymerizing propylene; and
(2) Copolymerizing propylene and ethylene in the presence of the polypropylene; or
(1) Producing polypropylene by homopolymerizing propylene; and
(2) Removing unreacted propylene monomer and, in the presence of the polypropylene, adding ethylene and polymerizing the resultant product.

In the former case, the obtained polymer is essentially a mixture of the polypropylene produced in step (1) and the propylene/ethylene copolymer produced in step (2).

If the olefin resin (C) used in the present invention is a propylene resin, this propylene resin preferably has a melt flow rate of 0.1 to 300 g/10 minutes, and more preferably 0.5 to 200 g/10 minutes, measured according to JIS K6758 at a temperature of 230° C. under a load of 21.18 N.

Examples of the ethylene resin used for olefin resin (C) in the present invention include: (1) an ethylene homopolymer containing 70 to 100% by weight of ethylene units; and (2) a copolymer of ethylene, an α-olefin having 3 to 10 carbon atoms (for example, propylene, 1-butene, 1-pentene, 4-methyl-1-pentene and 1-hexene) and/or a monomer having a polar group and a carbon-carbon double bond (for example, vinyl acetate, acrylates and methacrylates) containing 70 to 100% by weight of ethylene units. Preferred ethylene resins include high-density polyethylene, low-density polyethylene, ethylene/propylene copolymer, ethylene/1-butene copolymer, ethylene/1-pentene copolymer, ethylene/4-methyl-1-pentene copolymer and ethylene/1-hexene copolymer.

If the olefin resin (C) used in the present invention is an ethylene resin, this ethylene resin preferably has a melt flow rate of 0.01 to 300 g/10 minutes, and more preferably 0.1 to 200 g/10 minutes, measured according to JIS K6760 at a temperature of 190° C. under a load of 21.18 N.

The olefin resin (C) used in the present invention can be obtained by polymerizing by a known process. Examples of the polymerization method can include (1) polymerizing in an inert solvent such as hexane, heptane, toluene and xylene; (2) polymerizing liquid monomer(s) (bulk polymerization); (3) polymerizing gaseous monomer(s) (gas-phase polymerization); and (4) a combination of these methods, each of which methods uses a polymerization catalyst such as a Ziegler-Natta catalyst or a metallocene catalyst. The olefin resin (C) is not particularly limited in its steric structure. Examples of the steric structure can include an isotactic structure, a syndiotactic structure and a combination thereof. Of these, preferred is a propylene resin which is mainly isotactic structure.

Examples of the mineral oil softener (D) which is optionally used in the present invention can include a high-boiling point fraction of petroleum, which fraction has an average molecular weight of 300 to 1,500 and a fluid point of 0° C. or lower, such as an aromatic mineral oil, a naphthenic mineral oil and a paraffinic mineral oil. Among them, preferred is a paraffinic mineral oil. The mineral oil softener (D) can be contained in advance in the olefin copolymer rubber. In the rubber industry, an olefin copolymer rubber which contains a mineral oil softener is typically called an oil-extended rubber and the mineral oil softener is called an extender oil.

Examples of methods for obtaining an olefin copolymer rubber containing a mineral oil softener can include: (1) kneading mechanically both components with a kneading apparatus, such as a roll or a Banbury mixer; and (2) adding the mineral oil softener to a solution of the olefin copolymer rubber obtained in the production step of the olefin copolymer rubber (A), and then removing the solvent by a method such as steam stripping.

The crosslinking agent (E) in the present invention may be a crosslinking agent conventionally used for crosslinking rubber. Examples thereof include an organic peroxide, phenol resin, sulfur, a sulfur-containing compound, p-quinone, a derivative of p-quinone dioxime, a bismaleimide compound, an epoxy compound, a silane compound and amino resin. Among these examples, preferred is an organic peroxide or phenol resin.

Examples of the organic peroxide include dicumyl peroxide, di-tert-butyl peroxide, 2,5-dimethyl-2,5-di(tert-butylperoxy)hexane, 2,5-dimethyl-di(tert-butylperoxy)hexyne-3,1,3-bis(tert-butylperoxyiso-propyl)benzene, 1,1-bis(tert-butylperoxy)-3,3,5-trimethylcyclohexane, n-butyl-4,4-bis(tert-butylperoxy)valerate, benzoyl peroxide, p-chlorobenzoyl peroxide, 2,4-dichlorobenzoyl peroxide, tert-butylperoxy benzoate, tert-butylperoxyisopropyl carbonate, diacetyl peroxide, lauroyl peroxide and tert-butyl peroxide. Among these examples, preferred is 2,5-dimethyl-2,5-di(tert-butylperoxy)-hexyne-3,2,5-dimethyl-2,5-di(tert-butylperoxy)hexane or 1,3-bis(tert-butylperoxyisopropyl)benzene, and particularly preferred is 2,5-dimethyl-2,5-di(tert-butylperoxy)hexyne-3 having a high decomposition temperature.

The organic peroxide used in the present invention may be in liquid form, powder form or pellet form. To obtain good dispersibility, diluting is more preferably with a diluent such as an inert organic filler to the crosslinking reaction, mineral oil and a solvent. Further, it is more preferred to add this diluent in a liquid state. Among the diluent examples, a paraffinic mineral oil is preferred in consideration of its handleability and the effect it has on the product.

The organic peroxide may be combined with a crosslinking assistant in order to have a homogeneous and mild crosslinking reaction. The crosslinking assistant may be blended with a polyfunctional compound such as a sulfur, a methacrylate and a maleimide compound. Examples of the crosslinking assistant include sulfur, p-quinone dioxime, p,p'-dibenzoylquinone dioxime, ethyleneglycol dimethacrylate, diethyleneglycol dimethacrylate, triethyleneglycol dimethacrylate, tetraethyleneglycol dimethacrylate, polyethyleneglycol dimethacrylate, trimethylolpropane trimethacrylate, diallyl phthalate, tetraallyloxyethane, triallyl isocyanurate, N,N'-m-phenylenebismaleimide, maleic anhydride, divinylbenzene, zinc diacrylate, and zinc dimethacrylate. Among these examples, preferred is N,N'-m-phenylenebismaleimide, p,p'-dibenzoylquinone dioxime, divinylbenzene, trimethylolpropane trimethacrylate or triallyl isocyanurate. N,N'-m-phenylenebismaleimide can also be used by itself as a crosslinking agent.

Examples of the phenol resin used as the crosslinking agent (E) include compounds represented by the following formula (U.S. Pat. Nos. 3,287,440 and 3,709,840), conventionally used as a crosslinking agent for rubber:

[Formula 1]

wherein n is an integer of 0 to 10; X and Y are each independently a hydroxyl group, a halogenated alkyl group or a halogen atom; and R is a saturated hydrocarbon group having 1 to 15 carbon atoms. This compound can be produced by subjecting a substituted phenol and an aldehyde to condensation-polymerization with an alkali catalyst.

Further examples of the above-mentioned phenol resin include alkylphenol formaldehyde and brominated alkylphenol formaldehyde.

The phenol resin may be combined with a crosslinking promoter in order to regulate the crosslinking reaction rate. Examples of the crosslinking promoter include a metal halide such as stannous chloride and ferric chloride; and an organic halide such as a chlorinated polypropylene, brominated butyl rubber and chloroprene rubber.

The phenol resin is preferably combined with a dispersing agent such as a metal oxide (for example, zinc oxide) and stearic acid.

In the present invention, components other than the olefin copolymer rubber (A), volatile organic solvent (B), olefin resin (C), mineral oil softener (D) if used, and crosslinking agent (E), may be concomitantly used, for example, an inorganic filler such as talc and calcium carbonate; an additive such as a flame retardant, a plasticizer, an antistatic agent, a heat stabilizer, a light stabilizer, an antioxidant and a mold release agent; or a pigment. These components may be blended into the olefin copolymer rubber (A) or olefin resin (C), or may be added separately during the kneading in the extruder of the olefin copolymer rubber (A), volatile organic solvent (B) olefin resin (C) and, if used, mineral oil softener (D), or may be added separately during the kneading in the extruder of the olefin copolymer rubber (A), volatile organic solvent (B) olefin resin (C), mineral oil softener (D) if used, and crosslinking agent (E).

The present invention is a method for producing an olefinic thermoplastic elastomer by kneading an olefin copolymer rubber (A), a volatile organic solvent (B), an olefin resin (C) and, optionally, a mineral oil softener (D) in an extruder, removing the volatile organic solvent (B) while kneading, then adding a crosslinking agent (E) and further removing the volatile organic solvent (B) while kneading in the extruder.

Conventionally, if only the three components of an olefin copolymer rubber, an olefin resin and a crosslinking agent are supplied collectively to an extruder and kneaded, the temperature rapidly increases from the heat generated from shearing, whereby a crosslinking reaction suddenly occurs, thereby increasing the extrusion load. As a result, if molding is carried out using the obtained olefinic thermoplastic elastomer, the molded article has appearance defects.

According to the present invention, by kneading the olefin copolymer rubber (A), volatile organic solvent (B), olefin resin (C) and, optionally, mineral oil softener (D) in an extruder, removing the volatile organic solvent (B) while kneading, then adding the crosslinking agent (E) and further removing the volatile organic solvent (B) while kneading in the extruder, heat generated from shearing can be suppressed, and further, a sudden increase in temperature due to evaporative latent heat when removing the solvent can be suppressed, thereby allowing an olefinic thermoplastic elastomer suitable for the production of a molded article having a good appearance to be obtained.

The ratios of the olefin copolymer rubber (A), volatile organic solvent (B), olefin resin (C), mineral oil softener (D) optionally, and crosslinking agent (E) supplied to the extruder are as follows. The volatile organic solvent (B) is, to 100 parts by weight of olefin copolymer rubber (A), normally 1 part by weight or more, preferably 5 parts by weight or more, more preferably 11 parts by weight or more, still more preferably 15 parts by weight or more, and most preferably 20 parts by weight or more. The upper limit of the added amount of volatile organic solvent (B) is normally 50 parts by weight or less to 100 parts by weight of olefin copolymer rubber (A).

The ratio of olefin resin (C) to 100 parts by weight of olefin copolymer rubber (A) is normally 5 to 150 parts by weight, preferably 10 to 140 parts by weight, and more preferably 15 to 120 parts by weight.

If the mineral oil softener (D) is used, the ratio thereof to 100 parts by weight of olefin copolymer rubber (A) is normally 1 to 300 parts by weight, and in view of the balance between flexibility and adherence in the obtained olefinic thermoplastic elastomer, is preferably 5 to 200 parts by weight.

The added amount of crosslinking agent (E) to 100 parts by weight of olefin copolymer rubber (A) is preferably 0.01 to 20 parts by weight, more preferably 0.05 to 10 parts by weight, and still more preferably 0.05 to 5 parts by weight. By setting the added amount of crosslinking agent (E) in the above-described range, the olefinic thermoplastic elastomer has an excellent balance between elastic recovery properties and flexibility.

If a crosslinking assistant is used, the added amount thereof to 100 parts by weight of olefin copolymer rubber (A) is preferably 0.01 to 10 parts by weight, and more preferably 0.05 to 5 parts by weight.

In the production method according to the present invention, the olefinic thermoplastic elastomer may be produced by a single extruder or by a plurality of extruders coupled together. The used extruder is preferably a twin-screw extruder. The twin-screw extruder may be an extruder whose two screws rotate in the same direction, an extruder whose two screws rotate in opposite directions or an extruder whose two screws completely or partially engage with each other or do not engage with each other. However, of these, preferred is an extruder whose two screws rotate in the same direction and which completely or partially engage with each other.

In the present invention, it is not necessary for the olefin copolymer rubber (A), volatile organic solvent (B), olefin resin (C) and, if used, mineral oil softener (D), to be supplied simultaneously to the extruder. However, it is necessary for these three or four components to be simultaneously kneaded in the extruder. The extruder for kneading these three or four components, and for kneading these three or four components when the crosslinking agent (E) is added, must be a vented extruder having one or more vents, and preferably two or more vents, for discharging the volatile organic solvent (B). Further, when adding the crosslinking agent (E), a plunger pump is normally used, although some other pump may also be used. If the crosslinking agent (E) is added in solid form, such as a powder or pellet, it can be added using a feeder or the like.

An example of a method for producing an olefinic thermoplastic elastomer using one extruder is to supply the olefin copolymer rubber (A), volatile organic solvent (B), olefin resin (C) and, if used, mineral oil softener (D) to the extruder from one upstream supply port, remove the volatile organic solvent (B) from a vent while kneading the mixture in the extruder, then add the crosslinking agent (E) from a downstream supply port and further remove the volatile organic solvent (B) from a vent while kneading the mixture in the extruder.

Figure 2:
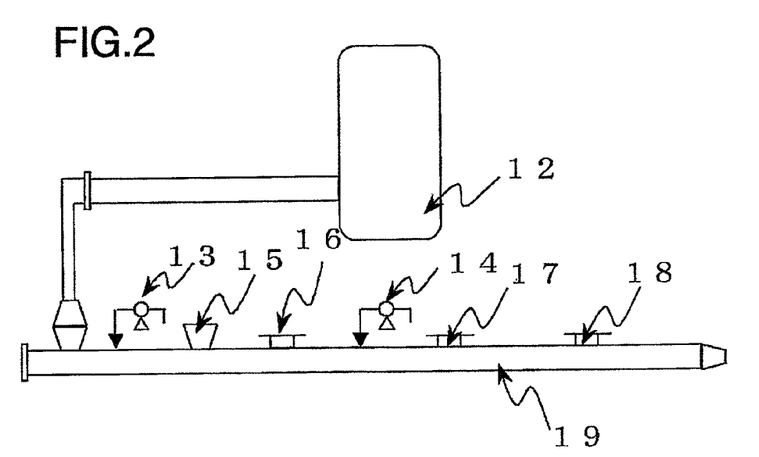
FIG. 2 is a schematic view of another extruder used in the present invention.

Another example of a method for producing an olefinic thermoplastic elastomer using one extruder is, using a vented extruder having a plurality of supply ports, to supply the olefin copolymer rubber (A), volatile organic solvent (B) and, if used, mineral oil softener (D) to the extruder from an upstream supply port and the olefin resin (C) from a downstream supply port, remove the volatile organic solvent (B) from a vent while kneading the mixture in the extruder, then add the crosslinking agent (E) from a lower downstream supply port and further remove the volatile organic solvent (B) from a vent while kneading the mixture in the extruder. The olefin resin (C) can be divided up and supplied from two or more supply ports. As illustrated in FIG. 2, in this method, a dispersion solution formed by dispersing the olefin copolymer rubber (A) polymerized in the polymerization tank (12) in a polymerization solvent may be directly supplied to the extruder (19). In this case, the polymerization solution acts as the volatile organic solvent (B). If the dispersion solution formed by dispersing the olefin copolymer rubber (A) in a polymerization solvent is directly supplied to the extruder, the supplied dispersion solution concentration may be adjusted by removing a certain amount of solvent in advance. The mineral oil softener (D), if used, is supplied from the mineral oil softener (D) supply pump (13), the olefin resin (C) is supplied from the olefin resin (C) supply port (15), and the resultant mixture is kneaded by the extruder (19) while the volatile organic solvent is removed from the vent (16). In addition, the crosslinking agent (E) may be added from the crosslinking agent (E) supply port (14) to obtain an elastomer while removing the volatile organic solvent from vents (17) and (18).

An example of a method for producing an olefinic thermoplastic elastomer using two extruders is to supply the olefin copolymer rubber (A) and volatile organic solvent (B) to a first extruder, supply the kneaded mixture to a second extruder coupled to the first extruder, further supply the mineral oil softener (D), if used, and olefin resin (C) to the second extruder, and while kneading the mixture, remove the volatile organic solvent (B) from a vent, then add the crosslinking agent (E) from a supply port provided downstream of the second extruder and further remove the volatile organic solvent (B) from a vent while kneading. The mineral oil softener (D) can also be supplied to the first extruder. In the case of using two extruders coupled together, a ventless extruder is used for the first extruder. For the second extruder, a vented extruder having at least two supply ports and having one or more vents between the upstream supply port and the downstream supply port and one or more vents further downstream from the downstream supply port is used. Thus, even when using two extruders, the concentration of the dispersion solution in which the olefin copolymer rubber (A) polymerized in a polymerization tank was dispersed in a polymerization solvent may be adjusted as needed, and then directly supplied to the first extruder.

In the case of using three extruders to produce the olefinic thermoplastic elastomer, an extruder is used having first and second extruders each coupled to a third extruder. The olefin copolymer rubber (A), volatile organic solvent (B) and, if used, mineral oil softener (D) are supplied to the first extruder. The olefin resin (C) is supplied to the second extruder. The olefinic thermoplastic elastomer can be obtained by merging the resultant mixtures in the third extruder, and while kneading this mixture, removing the volatile organic solvent (B) from a vent, then adding the crosslinking agent (E) and further removing the volatile organic solvent (B) while kneading in the extruder. In this case, a ventless extruder is used for the first extruder and a vented extruder is used for the third extruder. The second extruder may or may not have a vent. Thus, even when using three extruders, the concentration of the dispersion solution in which the olefin copolymer rubber (A) polymerized in a polymerization tank was dispersed in a polymerization solvent may be adjusted as needed, and then directly supplied to the first extruder.

Figure 3:
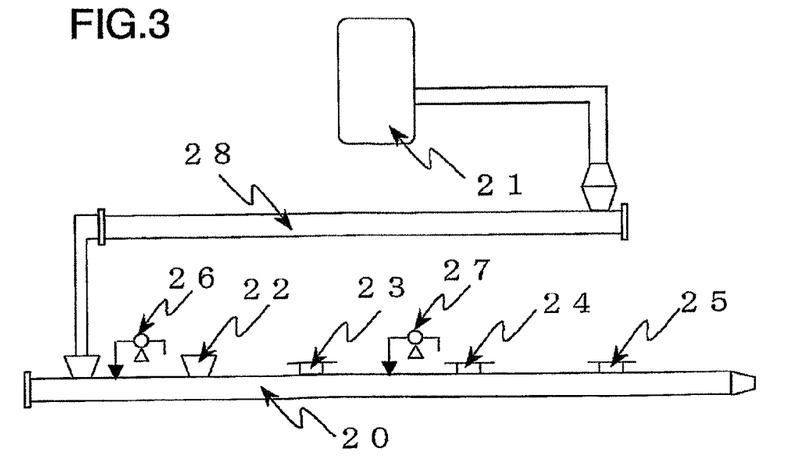
FIG. 3 is a schematic view of another extruder used in the present invention.

In the present invention, it is preferable to produce the olefinic thermoplastic elastomer using two extruders which are coupled together. The case of using two extruders will be described in detail using FIG. 3. FIG. 3 illustrates an apparatus in which a first extruder and a second extruder are coupled together. The olefin copolymer rubber (A) and volatile organic solvent (B) may be directly supplied from the olefin copolymer rubber polymerization tank (21) to the first extruder (28) via a not-shown concentration adjusting process. In the first extruder (28), the olefin copolymer rubber (A) and the volatile organic solvent (B) are kneaded. Then, this mixture is supplied to the second extruder (20), and is further kneaded along with, if used, the mineral oil softener (D) supplied from the supply pump (26) and the olefin resin (C) supplied from the supply port (22). The volatile organic solvent is removed from the vent (23) during the kneading. The crosslinking agent (E) is further added from the crosslinking agent (E) supply port (27). While kneading the mixture, the volatile organic solvent is removed from vents (24) and (25), whereby the elastomer is obtained.

The olefinic thermoplastic elastomer produced by the production process according to the present invention can be used, for example, for automobile parts such as a bumper part, a roof molding, a side molding, a body panel, a side shield, a glass run channel, an instrument panel skin, a door skin, a ceiling skin, a weatherstrip material, a hose, and a steering wheel; electric components such as a wire covering, a connector, and a cap plug; footwear such as a shoe sole and sandals; leisure goods such as swim fins, swimming goggles, a golf club grip, and a baseball bat grip; and industrial goods such as a gasket, various gaskets and sheets for civil engineering and construction, a waterproof sheet, a garden hose, a belt, and industrial packing.

EXAMPLES

The present invention will now be described in more detail with reference to the following examples. However, the present invention is not limited to these examples.
(1) Raw Materials As the olefin copolymer rubber (A), used was the veil-like Esprene 553 (manufactured by Sumitomo Chemical Co., Ltd.) ground with a grinder used for rubber (hereinafter, referred to as "EPDM-1"). The rubber was an ethylene/propylene/5-ethylidene-2-norbornene copolymer rubber having an ethylene unit content of 58.0% by weight, a propylene unit content of 37.5% by weight and a 5-ethylidene-2-norbornene unit content of 4.5% by weight.

As the olefin resin (C), used was Nobrene U501E1 (manufactured by Sumitomo Chemical Co., Ltd.) (hereinafter, referred to as "PP-1"). This resin was a propylene homopolymer having a melting point of 160° C. and a melt flow rate of 130 g/10 minutes measured at 230° C. under a load of 21.18 N.

As the volatile organic solvent (B), used was a mixture solvent obtained by mixing hexane and 5-ethylidene-2-norbornene in a weight ratio of hexane:5-ethylidene-2-norbornene=15:1 (hereinafter, referred to as "mixed solvent").

As the mineral oil softener (D), used was PW-100 (manufactured by Idemitsu Kosan Co., Ltd.) (hereinafter, referred to as "softener"). This softener was a paraffinic mineral oil having an average molecular weight of 545 and a flow point of −12.5° C.

As the crosslinking agent (E), used was APO-10DL, trade name, manufactured by Kayaku Akzo Corporation, in which 2,5-dimethyl-2,5-di(tert-butylperoxy)hexane was diluted to 10% using the paraffinic oil PW-100 (manufactured by Idemitsu Kosan Co., Ltd.).
(2) Apparatus An olefinic thermoplastic elastomer was produced using the apparatus illustrated in FIG. 1, in which a first extruder and a second extruder are coupled together. The first extruder was a twin-screw extruder having the product name "TEX65XCT" manufactured by The Japan Steel Works Ltd., with a cylinder inner diameter of 69 mm and a ratio (L/D) between cylinder length and cylinder inner diameter of 31.5. Further, a water pipe for cooling was provided on the inner side of the cylinder, and a heater for controlling the temperature was provided on the outer side of the cylinder. The second extruder was a twin-screw extruder having the product name "TEX30α" manufactured by The Japan Steel Works Ltd., with a cylinder inner diameter of 32 mm and a ratio (L/D) between cylinder length and cylinder inner diameter of 42. Further, a water pipe for cooling was provided on the inner side of the cylinder, and a heater for controlling the temperature was provided on the outer side of the cylinder.
(3) Molded Article Evaluation Using a pellet of the olefinic thermoplastic elastomer obtained in the Examples as a material, a 0.2 mm-thick extruded sheet was produced by a single-screw extruder (USV model) with a cylinder inner diameter of 25 mm having a full-flight type screw and a T-die, manufactured by Union Plastic.

The appearance of the obtained sheet was visually evaluated according to the number and size of fisheyes. Sheets having almost no fisheyes and a good appearance were rated as "Good", sheets having a few fisheyes but having no problems for practical use were rated as "Fair" and having many fisheyes and a poor appearance were rated as "Poor".

Example 1

Figure 1:
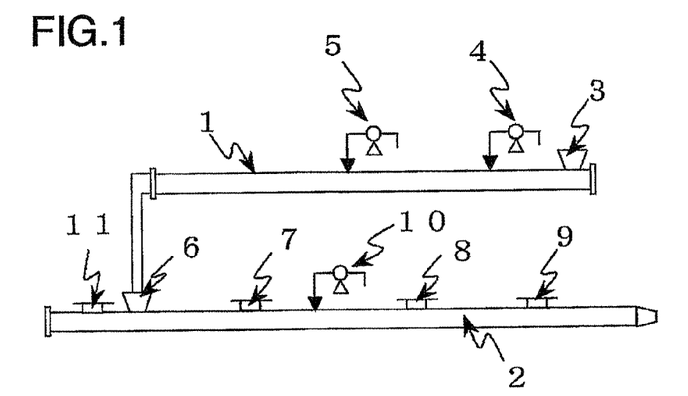
FIG. 1 is a schematic view of the vented twin-screw extruder used in the Examples and Comparative Examples of the present invention.

EPDM and PP were continuously supplied using a metered feeder respectively from a supply port (3) of the first extruder (1) at a supply rate of 20 kg/hr for the EPDM-1 and 8.6 kg/hr for the PP-1. Further, the mixed solvent was continuously supplied from a supply pump (4) on the first extruder at a supply rate of 4 kg/hr. The screw rotation speed of the first extruder (1) was set at 50 rpm, and the cylinder temperature was set at 130° C. At the first extruder (1), the EPDM-1, PP-1 and mixed solvent were mixed and continuously supplied to the second extruder (2) via a supply port (6). The screw rotation speed of the second extruder (2) was set at 400 rpm, and the cylinder temperature was set at 180° C. At the second extruder (2), the mixed solvent was removed from vent (7) and vent (11) while the EPDM, PP and mixed solvent were kneaded. Then, the crosslinking agent was supplied from the supply pump (10) of the second extruder at a supply rate of 0.06 kg/hr (a supply rate of 0.6 kg/hr with the APO-10DL), and the volatile organic solvent was removed from the vent (9) while kneading the mixture. The kneaded product was cut by a pelletizer which was also provided in the second extruder to thereby obtain pellet-shaped olefinic thermoplastic elastomer.

Example 2

The same procedures were conducted as in Example 1, except that a master batch having the following composition blended with the respective additives, such as the crosslinking assistant, were added from the supply port (3) of the first extruder (1) at 0.274 kg/hr using a metered feeder. The results are shown in Table 1.
<Master Batch Composition>
Crosslinking assistant: Trimethylolpropane trimethacrylate (manufactured by Seiko Chemical Co., Ltd., product name: Hi-Cross MS50) (concentration of 400 of the master batch).
Antioxidant: Pentaerythrityl-tetrakis[3-(3,5-di-t-butyl-4-hydroxy-phenyl)propionate] (manufactured by Ciba Specialty Chemicals K.K., trade name of Irganox 1010) (concentration of 10% of the master batch).
Light stabilizer: 2-(2-hydroxy-3-t-butyl-5-methylphenyl)-5-chlorobenzo-triazole (manufactured by Sumitomo Chemical Co., Ltd., trade name of Sumisorb 300) (concentration of 20% of the master batch).
Light stabilizer: Condensation product of 1-(2-hydroxyethyl)-2,2,6,6-tetramethyl-4-piperidinol and dimethyl succinate (manufactured by Ciba Specialty Chemicals K.K., trade name of Tinuvin 622) (concentration of 20% of the master batch).
Lubricant: Oleic acid amide (manufactured by Marubishi Oil Chemical Co., Ltd., trade name of Denon SL-12) (concentration of 10% of the master batch).

Example 3

The same procedures were conducted as in Example 1, except that the supply rate of the mixed solvent was changed to 2 kg/hr. The results are shown in Table 1.

TABLE 1

|  | Example 1 | Example 2 | Example 3 |
|---|---|---|---|
| EPDM-1 (parts by weight) | 100 | 100 | 100 |
| Mixed solvent (parts by weight) | 20 | 15 | 10 |
| PP-1 (parts by weight) | 43 | 43 | 43 |
| Crosslinking agent (parts by weight) | 0.3 | 0.3 | 0.3 |
| Crosslinking assistant | Not used | Used | Not used |
| Molded article evaluation | Good | Good | Fair |

Example 4

EPDM-1 and PP-1 were continuously supplied using a metered feeder respectively from a supply port (3) of the first extruder (1) at a supply rate of 20 kg/hr for the EPDM-1 and 8.6 kg/hr for the PP-1. Further, the mixed solvent was continuously supplied from a supply pump (4) on the first extruder at a supply rate of 4 kg/hr, and a softener was continuously supplied from a supply pump (5) at a supply rate of 6.8 kg/hr. The screw rotation speed of the first extruder (1) was set at 50 rpm, and the cylinder temperature was set at 130° C. At the first extruder, the EPDM-1, PP-1, mixed solvent and softener were mixed and continuously supplied to the second extruder (2) via a supply port (6). The screw rotation speed of the second extruder (2) was set at 400 rpm, and the cylinder temperature was set at 180° C. At the second extruder (2), the mixed solvent was removed from vent (7) and vent (11) while the EPDM-1, PP-1, mixed solvent and softener were kneaded. Then, the crosslinking agent was supplied from the supply pump (10) of the second extruder at a supply rate of 0.06 kg/hr (a supply rate of 0.6 kg/hr with the APO-10DL), and the volatile organic solvent was removed from the vent (9) while kneading the mixture. The kneaded product was cut by a pelletizer which was also provided in the second extruder to thereby obtain pellet-shaped olefinic thermoplastic elastomer.

Example 5

The same procedures were conducted as in Example 1, except that a master batch having the following composition blended with the respective additives, such as the crosslinking assistant, were added from the supply port (3) of the first extruder (1) at 0.274 kg/hr using a metered feeder. The results are shown in Table 2.
<Master Batch Composition>
Crosslinking assistant: Trimethylolpropane trimethacrylate (manufactured by Seiko Chemical Co., Ltd., product name: Hi-Cross MS50) (concentration of 40% of the master batch).
Antioxidant: Pentaerythrityl-tetrakis[3-(3,5-di-t-butyl-4-hydroxy-phenyl)propionate] (manufactured by Ciba Specialty Chemicals K.K., trade name of Irganox 1010) (concentration of 100 of the master batch).
Light stabilizer: 2-(2-hydroxy-3-t-butyl-5-methylphenyl)-5-chlorobenzo-triazole (manufactured by Sumitomo Chemical Co., Ltd., trade name of Sumisorb 300) (concentration of 20% of the master batch).
Light stabilizer: Condensation product of 1-(2-hydroxyethyl)-2,2,6,6-tetramethyl-4-piperidinol and dimethyl succinate (manufactured by Ciba Specialty Chemicals K.K., trade name of Tinuvin 622) (concentration of 20% of the master batch).
Lubricant: Oleic acid amide (manufactured by Marubishi Oil Chemical Co., Ltd., trade name of Denon SL-12) (concentration of 10% of the master batch).

Example 6

The same procedures were conducted as in Example 1, except that the supply rate of the mixed solvent was changed to 2 kg/hr. The results are shown in Table 2.

TABLE 2

|  | Example 4 | Example 5 | Example 6 |
|---|---|---|---|
| EPDM-1 (parts by weight) | 100 | 100 | 100 |
| Mixed solvent (parts by weight) | 20 | 15 | 10 |
| PP-1 (parts by weight) | 43 | 43 | 43 |

TABLE 2-continued

|  | Example 4 | Example 5 | Example 6 |
|---|---|---|---|
| Softener (parts by weight) | 34 | 34 | 34 |
| Crosslinking agent (parts by weight) | 0.3 | 0.3 | 0.3 |
| Crosslinking assistant | Not used | Used | Not used |
| Molded article evaluation | Good | Good | Fair |

(1) Raw Materials

As the olefin copolymer rubber (A), used was the veil-like Esprene 671F (manufactured by Sumitomo Chemical Co., Ltd.) ground with a grinder used for rubber (hereinafter, referred to as "EPDM-2"). The rubber was an ethylene/propylene/5-ethylidene-2-norbornene copolymer rubber having an ethylene unit content of 58.8% by weight, a propylene unit content of 37.7% by weight and a 5-ethylidene-2-norbornene unit content of 3.5% by weight, wherein PW-380 (manufactured by Idemitsu Kosan Co., Ltd.) as the mineral oil softener (D) was contained in 70 parts by weight based on 100 parts by weight of the copolymer. This softener was a paraffinic mineral oil having an average molecular weight of 746 and a flow point of −15° C.

As the olefin resin (C), used was Nobrene FS2011DG3 (manufactured by Sumitomo Chemical Co., Ltd.) (hereinafter, referred to as "PP-2"). This resin was a propylene homopolymer having a melting point of 160° C. and a melt flow rate of 2.5 g/10 minutes measured at 230° C. under a load of 21.18 N.

SumikaceneG201 (manufactured by Simitomo Chemical Co., Ltd.) was used (hereinafter referred to as "LDPE"). This resin was a low density polyethylene polymer having a melt flow rate of 2 g/10 minutes measured at 190° C. at a load of 21.18N.

As the volatile organic solvent (B), used was a mixture solvent obtained by mixing hexane and 5-ethylidene-2-norbornene in a weight ratio of hexane:5-ethylidene-2-norbornene=15:1 (hereinafter, referred to as "mixed solvent").

As the crosslinking agent (E), used was APO-10DL, trade name, manufactured by Kayaku Akzo Corporation, in which 2,5-dimethyl-2,5-di(tert-butylperoxy)hexane was diluted to 10% using the paraffinic oil PW-100 (manufactured by Idemitsu Kosan Co., Ltd.).

(2) Apparatus

Figure 4:
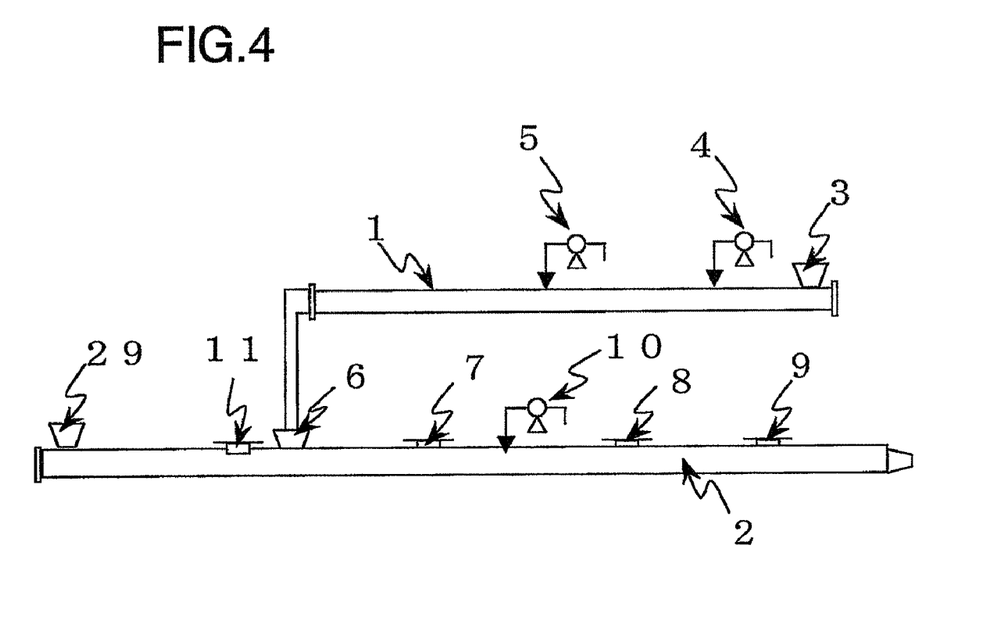
FIG. 4 is a schematic view of another extruder used in the present invention.

An olefinic thermoplastic elastomer was produced using the apparatus illustrated in FIG. 4, in which a first extruder and a second extruder are coupled together. The first extruder was a twin-screw extruder having the product name "TEX65XCT" manufactured by The Japan Steel Works Ltd., with a cylinder inner diameter of 69 mm and a ratio (L/D) between cylinder length and cylinder inner diameter of 31.5. Further, a water pipe for cooling was provided on the inner side of the cylinder, and a heater for controlling the temperature was provided on the outer side of the cylinder. The second extruder was a twin-screw extruder having the product name "TEX30α" manufactured by The Japan Steel Works Ltd., with a cylinder inner diameter of 32 mm and a ratio (L/D) between cylinder length and cylinder inner diameter of 52.5. Further, a water pipe for cooling was provided on the inner side of the cylinder, and a heater for controlling the temperature was provided on the outer side of the cylinder.

Example 7

EPDM-2 was continuously supplied using a metered feeder from a supply port (3) of the first extruder (1) at a supply rate of 25 kg/hr. PP-2, LDPE, and a master batch of the following composition having added various additives such as crosslinking assistant, were continuously supplied using a metered feeder from a supply port (29) of the second extruder (1) at supply rates of 5.6 kg/hr, 3.4 kg/hr, and 0.374 kg/hr, respectively. Further, the mixed solvent was continuously supplied from a supply pump (4) on the first extruder at a supply rate of 5 kg/hr. The screw rotation speed of the first extruder (1) was set at 50 rpm, and the cylinder temperature was set at 130° C. At the first extruder (1), the EPDM, PP, LDPE and mixed solvent were mixed and continuously supplied to the second extruder (2) via a supply port (6). The screw rotation speed of the second extruder (2) was set at 400 rpm, and the cylinder temperature was set at 180° C. At the second extruder (2), the mixed solvent was removed from vent (7) and vent (11) while the EPDM, PP, LDPE and mixed solvent were kneaded. Then, the crosslinking agent was supplied from the supply pump (10) of the second extruder at a supply rate of 0.055 kg/hr (a supply rate of 0.55 kg/hr with the APO-10DL), and the volatile organic solvent was removed from the vent (9) while kneading the mixture. The kneaded product was cut by a pelletizer which was also provided in the second extruder to thereby obtain pellet-shaped olefinic thermoplastic elastomer. The results are shown in Table 3.

<Master Batch Composition>

Crosslinking assistant: Trimethylolpropane trimethacrylate (manufactured by Seiko Chemical Co., Ltd., product name: Hi-Cross MS50) (concentration of 40% of the master batch).

Antioxidant: Pentaerythrityl-tetrakis[3-(3,5-di-t-butyl-4-hydroxy-phenyl)propionate] (manufactured by Ciba Specialty Chemicals K.K., trade name of Irganox 1010) (concentration of 10% of the master batch).

Light stabilizer: 2-(2-hydroxy-3-t-butyl-5-methylphenyl)-5-chlorobenzo-triazole (manufactured by Sumitomo Chemical Co., Ltd., trade name of Sumisorb 300) (concentration of 20% of the master batch).

Light stabilizer: Condensation product of 1-(2-hydroxyethyl)-2,2,6,6-tetramethyl-4-piperidinol and dimethyl succinate (manufactured by Ciba Specialty Chemicals K.K., trade name of Tinuvin 622) (concentration of 20% of the master batch).

Lubricant: Oleic acid amide (manufactured by Marubishi Oil Chemical Co., Ltd., trade name of Denon SL-12) (concentration of 10% of the master batch).

Example 8

The same procedures were conducted as in Example 7, except that the supply rate of the mixed solvent was changed to 2.5 kg/hr. The results are shown in Table 3.

Comparative Example 1

The same procedures were conducted as in Example 7, except that no mixed solvent was supplied. The results are shown in Table 3.

TABLE 3

|  | Example 7 | Example 8 | Comparative Example 1 |
|---|---|---|---|
| EPDM (parts by weight) | 100 | 100 | 100 |
| Mixed solvent (parts by weight) | 20 | 10 | 0 |
| PP (parts by weight) | 22.5 | 22.5 | 22.5 |

TABLE 3-continued

|  | Example 7 | Example 8 | Comparative Example 1 |
|---|---|---|---|
| LDPE (parts by weight) | 13.6 | 13.6 | 13.6 |
| Crosslinking agent (parts by weight) | 0.22 | 0.22 | 0.22 |
| Crosslinking assistant | Used | Used | Used |
| Molded article evaluation | Good | Fair | Poor |

The invention claimed is:

1. A method for producing an olefinic thermoplastic elastomer comprising the steps of
kneading an olefin copolymer rubber (A) obtained by polymerizing ethylene, an α-olefin having 3 to 20 carbon atoms and a non-conjugated polyene, a volatile organic solvent (B) and, an olefin resin (C) in an extruder,
removing the volatile organic solvent (B) while kneading, then adding a crosslinking agent (E) and further removing the volatile organic solvent (B) while kneading in the extruder to obtain the olefinic thermoplastic elastomer,
wherein the olefin resin (C) is a resin obtained by polymerization of ethylene and/or an α-olefin, and
wherein 100 parts by weight of the olefin copolymer rubber (A),
and based on 100 parts by weight of the olefin copolymer rubber (A), 15 to 50 parts by weight of the volatile organic solvent (B) and
5 to 150 parts by weight of the olefin resin (C) are mixed together to obtain a mixture, the volatile organic solvent (B) is removed from the mixture while kneading in the extruder,
then to 100 parts by weight of the olefin copolymer rubber (A), 0.01 to 20 parts by weight of the crosslinking agent (E) is added and
the volatile organic solvent (B) is further removed while kneading in the extruder to obtain the olefinic thermoplastic elastomer.

2. The method according to claim 1, wherein a mineral oil softener (D) is further kneaded in together with the olefin copolymer rubber (A), volatile organic solvent (B) and olefin resin (C).

3. The method according to claim 1, wherein the mixture further comprises 1 to 300 parts by weight of a mineral oil softener (D).

4. The method according to any one of claims 1, 2 or 3, wherein the olefin resin (C) is a propylene resin.

5. The method according to claim 1, wherein the volatile organic solvent (B) is kneaded in an amount of 20 to 50 parts by weight.

* * * * *